United States Patent
Hillier, III et al.

(10) Patent No.: US 7,899,940 B2
(45) Date of Patent: *Mar. 1, 2011

(54) SERVICING COMMANDS

(75) Inventors: Philip R. Hillier, III, Rochester, MN (US); Joseph A. Kirscht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 11/844,263

(22) Filed: Aug. 23, 2007

(65) Prior Publication Data

US 2007/0288676 A1    Dec. 13, 2007

Related U.S. Application Data

(63) Continuation of application No. 10/988,256, filed on Nov. 12, 2004, now Pat. No. 7,346,713.

(51) Int. Cl.
G06F 3/00 (2006.01)
G06F 13/24 (2006.01)

(52) U.S. Cl. ............................... 710/1; 710/260

(58) Field of Classification Search ................ 710/1
See application file for complete search history.

(56) References Cited

U.S. PATENT DOCUMENTS

| | | | | |
|---|---|---|---|---|
| 4,121,285 A | * | 10/1978 | Chen | 710/40 |
| 5,557,768 A | * | 9/1996 | Braceras et al. | 711/131 |
| 5,652,860 A | * | 7/1997 | Sato | 711/154 |
| 6,457,087 B1 | * | 9/2002 | Fu | 710/305 |
| 6,920,534 B2 | * | 7/2005 | Dover | 711/151 |
| 2003/0041185 A1 | * | 2/2003 | Creta et al. | 710/5 |
| 2004/0049624 A1 | * | 3/2004 | Salmonsen | 710/306 |
| 2004/0059840 A1 | * | 3/2004 | Perego et al. | 710/6 |
| 2005/0097265 A1 | * | 5/2005 | Shrader et al. | 711/105 |
| 2007/0073980 A1 | * | 3/2007 | Chung | 711/149 |

* cited by examiner

*Primary Examiner* — Alford W Kindred
*Assistant Examiner* — Brooke J Dews
(74) *Attorney, Agent, or Firm* — Dugan & Dugan, PC (57) ABSTRACT

In a first aspect, a first method is provided for servicing commands. The first method includes the steps of (1) receiving a first command for servicing in a memory controller including a plurality of memory ports, wherein the first command is of a first priority; (2) receiving a second command for servicing in the memory controller, wherein the second command is of a second priority that is higher than the first priority; (3) determining whether the first and second commands will be serviced through the same memory port; and (4) if the first and second commands will not be serviced through the same memory port, servicing the first and second commands during the same time period. Numerous other aspects are provided.

18 Claims, 4 Drawing Sheets

SERVICING COMMANDS

The present application is a continuation of and claims priority to U.S. patent application Ser. No. 10/988,256, filed Nov. 12, 2004 now U.S. Pat. No. 7,364,713, which is hereby incorporated by reference herein in its entirety.

FIELD OF THE INVENTION

The present invention relates generally to processors, and more particularly to methods and apparatus for servicing commands.

BACKGROUND

During conventional command processing (e.g., servicing), when a first command of a first priority and a second command of a second, higher, priority require servicing during a time period (e.g., processor cycle), the second command is serviced and servicing of the first command is delayed until a subsequent time period. However, if other commands of the second priority are received in subsequent time periods, servicing of the first command may be delayed indefinitely. More efficient servicing of commands may be desirable.

SUMMARY OF THE INVENTION

In a first aspect of the invention, a first method is provided for servicing commands. The first method includes the steps of (1) receiving a first command for servicing in a memory controller including a plurality of memory ports, wherein the first command is of a first priority; (2) receiving a second command for servicing in the memory controller, wherein the second command is of a second priority that is higher than the first priority; (3) determining whether the first and second commands will be serviced through the same memory port; and (4) if the first and second commands will not be serviced through the same memory port, servicing the first and second commands during the same time period.

In a second aspect of the invention, a first apparatus is provided for servicing commands. The first apparatus includes (1) request handler logic for receiving commands for servicing from at least one of a processor and a scalability port; (2) queue logic for receiving commands for servicing from at least one of the request handler logic and an input/output (I/O) port; and (3) a memory controller for interfacing with memory, including a plurality of memory ports, coupled to the request handler logic and the queue logic. The apparatus is adapted to (a) receive a first command for servicing in the memory controller, wherein the first command is of a first priority; (b) receive a second command for servicing in the memory controller, wherein the second command is of a second priority that is higher than the first priority; (c) determine whether the first and second commands will be serviced through the same memory port; and (d) if the first and second commands will not be serviced through the same memory port, servicing the first and second commands during the same time period. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides methods and apparatus for improving the efficiency with which commands are serviced in a computer system or the like. A memory controller included in the computer system may include multiple ports for coupling to a memory. In response to receiving a command, the computer system may need to access a portion of the memory through one of the multiple ports, thereby accessing memory for the command.

According to the present methods and apparatus, the computer system may receive read commands of different priorities. For example, the computer system may receive a read command of a first priority from a queue for storing pending commands. During the same time period (e.g., processor cycle), the computer system may also receive a command of a second priority that is higher than the first priority, such as a read command received from a scalability port for coupling to other memory controllers or from a processor. In a conventional system with multiple ports for coupling to a memory, when a command from a processor and a command from a queue require servicing in the same time period, the command from the processor is serviced and servicing of the command from the queue is delayed. Because the processor in such a system only issues commands every other time period, the command from the queue is serviced in the next time period.

However, with the development of a multiprocessor computer system in which a processor command may be issued every time period, after such a computer system delays a command from a queue to service a processor command received in the same time period, the computer system may continue to receive commands from a processor in subsequent time periods. Therefore, servicing of the command from the queue may be delayed indefinitely.

In contrast, according to the present invention, if a command of the first priority and second priority require servicing in the same cycle, the computer system determines whether the computer system may (e.g., must) access the same memory port to service the commands. If so, the higher priority command (e.g., command of the second priority) is serviced, and servicing of the command of the first priority is delayed. Alternatively, if the computer system determines it may (e.g., must) not access the same memory port to service the commands (e.g., determines the commands may be serviced through different memory ports), the commands may be serviced simultaneously. In this manner, the efficiency with which commands are serviced in a computer system or the like is improved.

Figure 1:
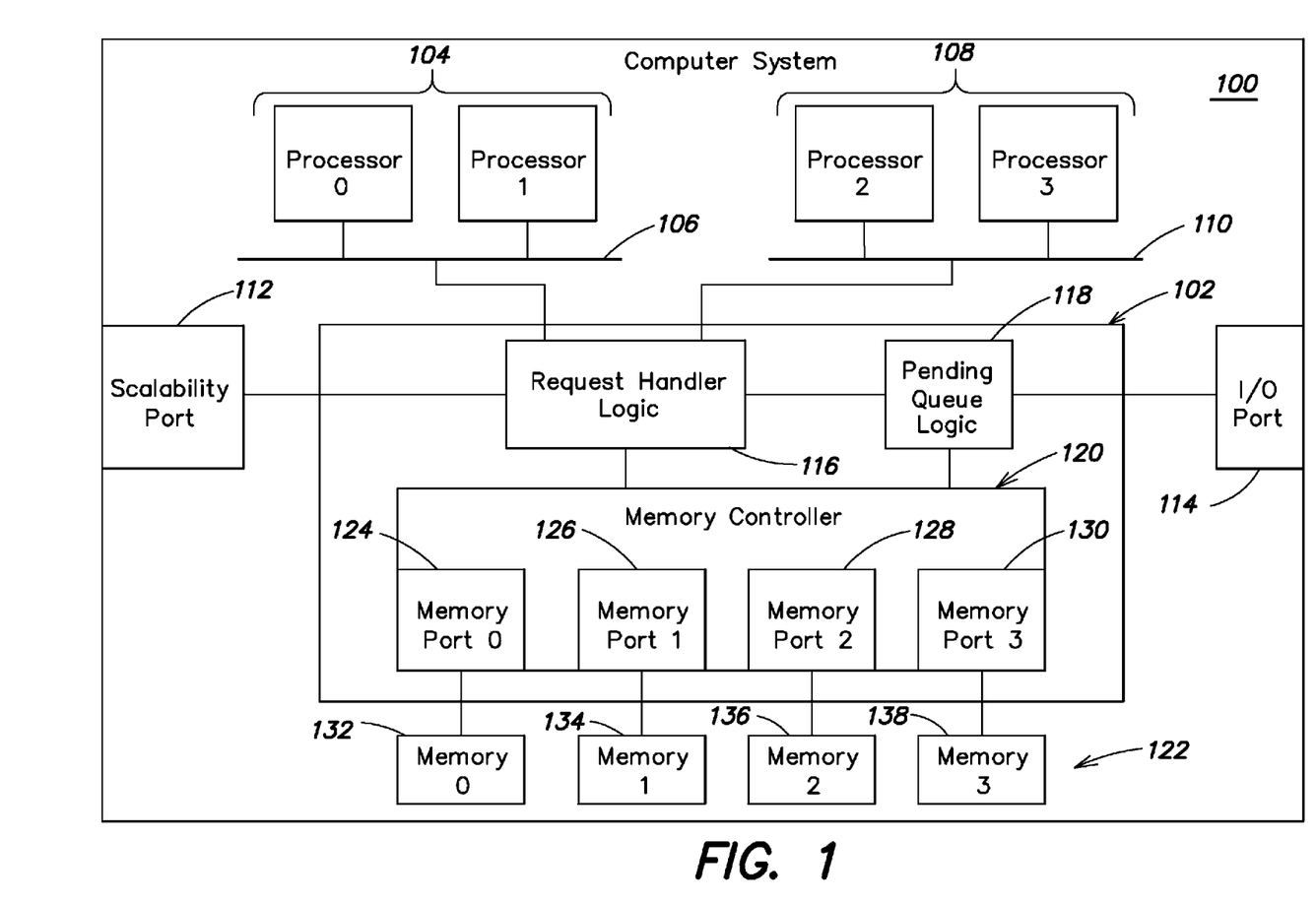
FIG. 1 is a block diagram of an apparatus for servicing commands in accordance with an embodiment of the present invention.

FIG. 1 is a block diagram of an apparatus for servicing commands in accordance with an embodiment of the present invention. With reference to FIG. 1, the apparatus 100 may be a computer system or the like. The apparatus 100 may include a plurality of processors coupled to command servicing logic 102 (described below) via one or more busses. More specifically, the apparatus 100 may include a first plurality of processors 104 coupled to the command servicing logic 102 via a first bus 106 and second plurality of processors 108 coupled to the command servicing logic 102 via a second bus 110. Although the first 104 and second plurality or processors 108 each include two processors, the first 104 and/or second plurality of processors 108 may include a larger or smaller number of processors. Further, although the apparatus 100 include two busses, a larger or smaller number of busses may be employed.

The apparatus 100 includes a scalability port 112 coupled to the command processing logic 102. The scalability port 112 may be employed for coupling to other command processing logic via a scalability network (not shown). The apparatus 100 includes an input/output (I/O) port 114 coupled to the command processing logic 102. The I/O port 114 may be employed for receiving direct memory access (DMA) commands.

The command processing logic 102 includes request handler logic 116 coupled to pending queue logic 118 and a memory controller 120. The request handler logic 116 may be coupled to the first 106 and second busses 110 and scalability port 112, and is adapted to receive commands for servicing from a processor via the first 106 or second bus 110 and/or from the scalability port 112 and provide such commands to the pending queue logic 118 or the memory controller 120.

The pending queue logic 118 is also coupled to and receives commands from the I/O port 114. The pending queue logic 118 stores received commands in a storage area (e.g., queue) and outputs a command stored in the queue to the memory controller 120.

The command processing logic 102 is coupled to memory (e.g., one or more DRAMs) 122. More specifically, the memory controller 120 includes a plurality of memory ports (e.g., a first through fourth memory ports 124-130) for coupling to the memory 122. For example, each memory port 124-130 may couple to a respective DRAM 132-138 included in the memory 122. Although the memory controller 120 includes four memory ports, a larger or smaller number of memory ports may be employed. Commands received by the memory controller 120 from the pending queue logic 118 are of a first priority and commands received by the memory controller 120 from the request handler logic 116 are of a second priority, which is higher than the first priority. The memory controller 120 is adapted to receive such commands for servicing from the request handler logic 116 and/or pending queue logic 118 and service one or more such commands possibly during the same time period (e.g., processor cycle). While servicing a command, the command servicing logic 102 may access one or more memory ports 124-130.

The command servicing logic 102 may include any suitable combination of logic, registers, memory or the like, and in at least one embodiment may comprise an application specific integrated circuit (ASIC). Details of the command servicing logic 102 are described below with reference to FIGS. 2A and 2B.

Figure 2A:
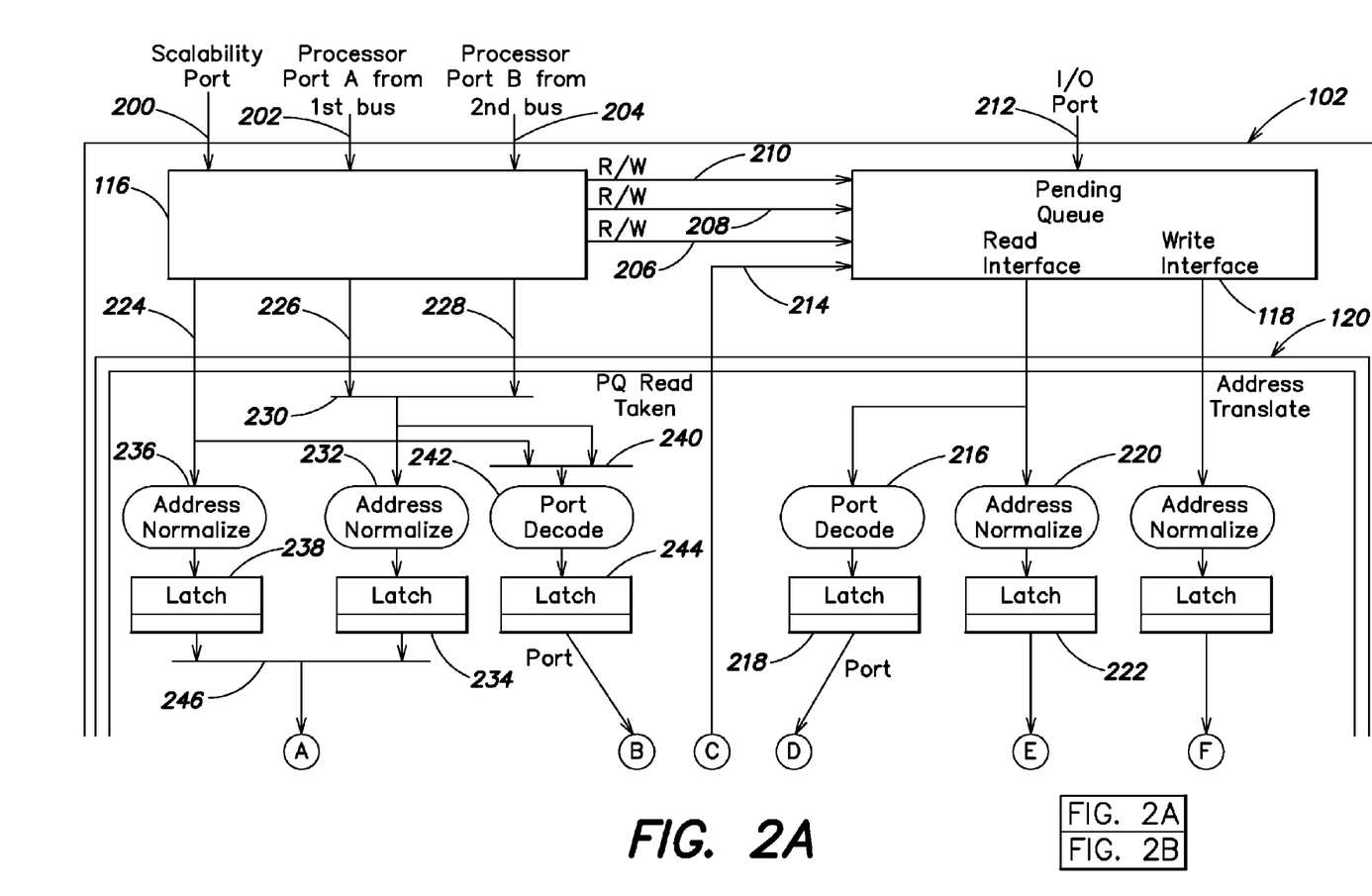
FIGS. 2A and 2B illustrate a block diagram of command servicing logic included in the apparatus for servicing commands in accordance with an embodiment of the present invention.
Figure 2B:
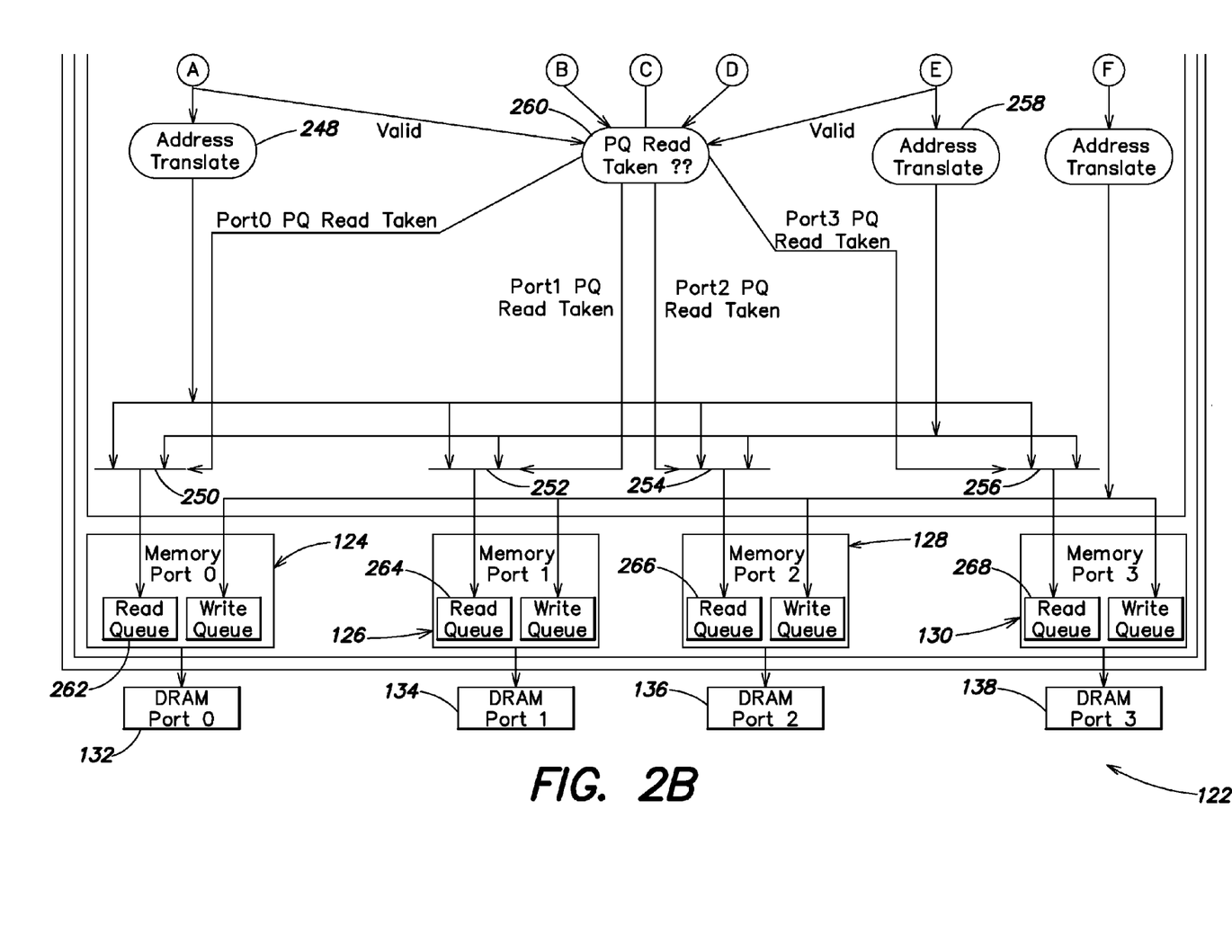

FIGS. 2A and 2B illustrate a block diagram of command servicing logic included in the apparatus for servicing commands in accordance with an embodiment of the present invention. With reference FIGS. 2A and 2B, the command servicing logic 102 includes request handler logic 116 for receiving commands for servicing and providing such commands to the pending queue logic 118 or the memory controller 120. The first bus 106, second bus 110 and scalability port 112 are coupled to respective inputs 200-204 of the request handler logic 116 and may provide commands to the request handler logic 116 via the inputs 200-204. Processors coupled to the first 106 and second busses 110 are out of phase such that the request handler logic 118 may alternately receive a processor command from the first 106 and second busses 110. One or more commands input by the request handler logic 116 may be output from the request handler logic 116 and input by the pending queue logic 118 via respective inputs 206-210. The pending queue logic 118 may also receive a command from an I/O port 114 coupled to another pending queue logic input 212. In this manner, the pending queue logic 118 may receive a command from a processor, scalability port or an I/O port and store such command in a queue. The pending queue logic includes an input 214 for receiving a signal indicating whether a read command from the pending queue was just serviced (e.g., serviced in the previous time period) by the computer system 100. Based on the signal indicating whether a read command from the pending queue was just serviced by the computer system 100, the pending queue logic 118 may output a read command from the queue to the memory controller 120 during a subsequent time period (e.g., the next cycle).

A command output from the queue (e.g., queue command) may be input by first port decode logic 216 for determining which memory port 124-130 in the memory controller 120 the computer system 100 must access to service a command. For example, the first port decode logic 216 is adapted to determine which memory port 124-130 the computer system 100 must access to service the queue command based on a real memory address associated with the queue command. A real memory address associated with a command is the system level address. The memory 122 coupled to the command servicing logic 102 may be configured such that the first port decode logic 216 may directly extract which memory port 124-130 the computer system 100 may (e.g., must) access to service the queue command from the real memory address associated with the queue command. More specifically, the configuration of the memory 122 may be such that a performance address map, from which a memory port 124-130 that the computer system 100 must access to service the queue command may be extracted directly from the real memory address associated with the command, may be employed. The first port decode logic 216 outputs such port information to a latch 218 coupled to the first port decode logic 216. In some embodiments, a memory configuration in which all or a specific subset of memory ports are plugged with matching DRAM technology in specific memory extents is employed. Such memory configuration may result in low memory latency. However, a different memory configuration (e.g., a more general memory configuration) may be employed. For example, a less specific memory configuration in which each memory port is plugged with the same size of memory may be employed.

Additionally, the queue command may be input by first address normalize logic 220 for converting a real memory address associated with a command to a physical memory address (e.g., an address specific to the command servicing logic 102). A physical memory address associated with a command is an address specific to a given node with memory base offsets, memory holes and remote caches normalized out. For example, the first address normalize logic 220 may convert a real address associated with a queue command to a physical memory address associated with the queue command. The first address normalize logic 220 may output the queue command with the associated physical memory address (along with command qualification signals) to a latch 222 coupled to the address normalize logic 220.

Similarly, the request handler logic 116 outputs data received from the scalability port 112, first bus 106 and second bus 110 via respective outputs 224-228 to the memory controller 120. More specifically, the request handler logic 116 outputs data received from the first 106 and second busses 110 to a first multiplexer 230 as input. The first multiplexer 230 is adapted to selectively output one such input. For example, the first multiplexer may output data received from the first bus 106 during even numbered clock cycles and the second bus 110 during odd numbered clock cycles. In this manner, the output of the first multiplexer 230 every time period may be a command for servicing from a processor coupled to the first 106 or second bus 110 (e.g., a processor command). However, the first multiplexer 230 may output data in a different manner.

The output of the first multiplexer 230 may be coupled to second address normalize logic 232. The second address normalize logic 232 is similar to the first address normalize logic 220, and therefore, may convert a real memory address associated with the processor command to a physical memory address associated with the processor command. The second address normalize logic 232 may output the processor command with the associated physical memory address to a latch 234 coupled to the second address normalize logic 232.

The request handler logic 116 outputs data received from the scalability port 112 to third address normalize logic 236. The third address normalize logic 236 is similar to the first 220 and second address normalize logic 232, and therefore, may convert a real memory address associated with the command from the scalability port (e.g., scalability port command) to a physical memory address associated with the scalability port command. The third address normalize logic 236 may output the scalability port command with the associated physical address to a latch 238 coupled to the third address normalize logic 236. In this manner, a processor command, scalability port command and queue command may be normalized independently (e.g., during a time period such command is presented to the memory controller 120).

Additionally, the output of the first multiplexer 230, which may be a processor command, and the scalability port command output from the request handler logic 116 to the memory controller 120 may be input by a second multiplexer 240. The second multiplexer 240 selectively outputs one of the input commands. For example, the second multiplexer 240 may output a command input by the second multiplexer 240 based on a control signal (not shown) input by the second multiplexer 240. The control signal input by the second multiplexer 240 may be respective valid signals included in the processor and scalability port commands for indicating whether such commands input by the second multiplexer 240 are valid. For example, if the valid signal included in the scalability port command is asserted and the valid signal included in the processor command is not asserted, the second multiplexer 240 may output the scalability port command. Otherwise, the second multiplexer 240 may output the processor command.

The output of the second multiplexer 240, which may be a processor or scalability port command, is coupled to and input by second port decode logic 242. The second port decode logic 242 is similar to the first port decode logic 216. Therefore, the second port decode logic 242 is adapted to determine which memory port 124-130 the computer system 100 must access to service the command (e.g., processor or scalability port command) input by the second port decode logic 242 based on a real memory address associated with such command. The memory 122 coupled to the command servicing logic 102 may be configured such that the second port decode logic 242 may directly extract which memory port 124-130 the computer system 100 must access to service the processor or scalability port command input by the second port decode logic 242 from the real memory address associated with the command. More specifically, the configuration of the memory 122 may be such that a performance address map, from which a memory port 124-130 that the computer system 100 must access to service the processor or scalability port command may be extracted directly from the real memory address associated with the command, may be employed. The second port decode logic 242 may output such port information to a latch 244 coupled to the port decode logic 242. The latches 218, 222, 234, 238, 244 described above are employed for timing purposes.

The output of the latch 234 coupled to the second address normalize logic 232, which represents a processor command with an associated physical memory address, and output of the latch 238 coupled to the third address normalize logic 236, which represents a scalability port command with an associated physical memory address, are coupled to and input by a third multiplexer 246. The third multiplexer 246 selectively outputs selectively outputs one of the input commands. For example, the third multiplexer 246 may output a command input by the third multiplexer 246 based on a control signal (not shown) input by the third multiplexer 246. Similar to the second multiplexer 240, the control signal input by the third multiplexer 246 may be respective valid signals included in the processor and scalability port commands for indicating whether such commands input by the third multiplexer 246 are valid. For example, if the valid signal included in the scalability port command is asserted and the valid signal included in the processor command is not asserted, the third multiplexer 246 may output the processor command with associated physical memory address. Otherwise, the third multiplexer 246 outputs the scalability port command with associated physical memory address.

The output of the third multiplexer 246 is coupled to and input by first address translate logic 248. The first address translate logic 248 is adapted to convert a physical memory address associated with a command to a DRAM address associated with the command. A DRAM address associated with a command is the chip select, row address, column address and internal bank information. Therefore, the first address translate logic 248 may receive a processor or scalability port command with an associated physical memory address and outputs such command with an associated DRAM address. The output of the first address translate logic 248 is coupled to and input by each of a fourth through seventh multiplexers 250-256 included in the memory controller 120.

Similarly, the output of the latch 222 coupled to the first address normalize logic 220, which represents a queue command with an associated physical memory address, are coupled to and input by a second address translate logic 258. The second address translate logic 258 is similar to the first address translate logic 248, and therefore, may receive a queue command with an associated physical memory address and output such command with an associated DRAM address. The output of the second address translate logic 258 is coupled to and input by each of the fourth through seventh multiplexers 250-256 as a second input.

Further, an output of the latch 218 coupled to the first port decode logic 216 is coupled to and input by logic for determining whether a read command from the queue will be serviced (e.g., PQ Read Taken logic 260.) More specifically, a signal (e.g., Port) indicating whether a memory port which the computer system 100 must access to service the queue command is input by the PQ Read Taken logic 260. An output of the latch 222 coupled to the first address normalize 220 is coupled to and input by the PQ Read Taken logic 260. More specifically, a signal (e.g., Valid) indicating whether the queue command output by the latch 222 is valid is input by the PQ Read Taken logic 260.

Similarly, an output of the latch 244 coupled to the second port decode logic 242 is coupled to and input by the PQ Read Taken logic 260. More specifically, a signal (e.g., Port) indicating whether a memory port 124-130 which the computer system 100 must access to service the processor or scalability port command is input by the PQ Read Taken logic 260. An output of the third multiplexer 246 coupled to the first address translate logic 248 is coupled to and input by the PQ Read Taken logic 260. More specifically, a signal (e.g., Valid) indicating whether the processor or scalability port command output by the latch 222 is valid is input by the PQ Read Taken logic 260.

Based on the data input by the PQ Read Taken logic 260, the PQ Read Taken logic 260 is adapted to output a signal indicating whether a queue command is serviced and output a respective signal to each of the fourth 250 through seventh multiplexers 256 that serves as a control signal. Based on such respective control signals, each of the fourth through seventh multiplexers 250-256 may selectively output the scalability port or processor command received via a first input or the queue command received via the second input. An output of the fourth 250 through seventh multiplexers 256 is coupled to the first through fourth memory ports 124-130, respectively. More specifically, an output of the fourth 250 through seventh multiplexers 256 is coupled to a respective read queue 262-268 included in the first through fourth memory ports 124-130. In this manner, the fourth 250 through seventh multiplexers 256 may output a command to the first 132 through fourth memory port 138, respectively. Each memory port 124-130 is adapted to determine whether a command received in the memory port 124-130 includes a signal indicating the command is valid and accepts or rejects such command based on such signal.

Further, the PQ Read Taken logic 260 is adapted to output a feedback signal (e.g., PQ Read Taken) indicating whether a queue command (e.g., a queue read command) was just serviced by the computer system 100 to the pending queue logic 118. The above-described path that may be taken by a processor (e.g., or scalability port) command through the command servicing logic 102 may be referred to as a fast path and the path that may be taken by a queue command through the command servicing logic 102 may be referred to as a queued path.

Figure 3:
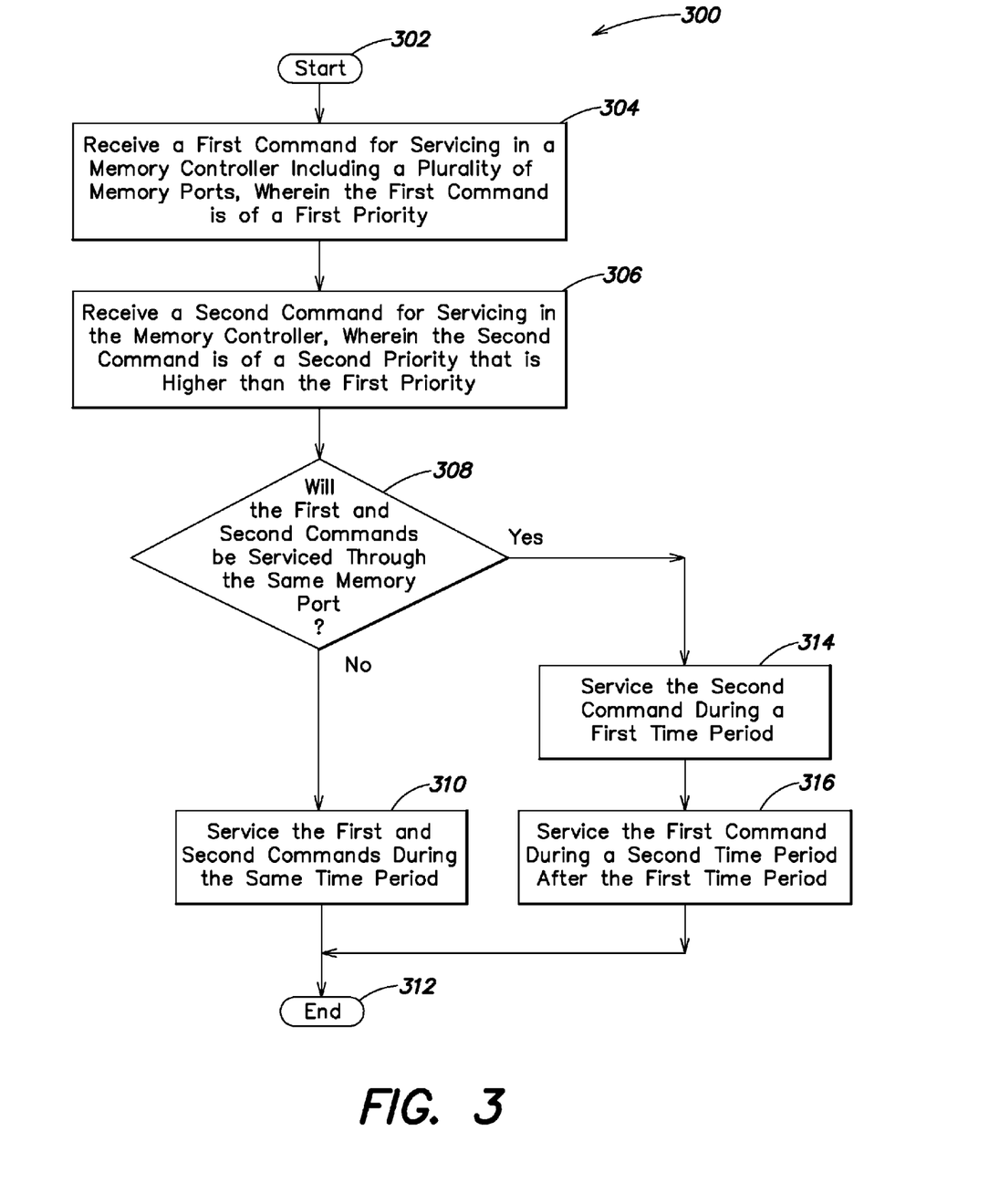
FIG. 3 illustrates a method for servicing commands in accordance with an embodiment of the present invention.

The operation of the apparatus for servicing commands is now described with reference to FIGS. 1-2, and with reference to FIG. 3 which illustrates a method for servicing commands in accordance with an embodiment of the present invention. With reference to FIG. 3, in step 302, the method 300 begins. In step 304, a first command for servicing is received in a memory controller including a plurality of memory ports, wherein the first command is of a first priority. For example, the pending queue logic 118 may receive a signal from the PQ Read Taken logic 260 indicating a queue command (e.g., a queue read command) was just serviced. Therefore, the pending queue logic 118 may output a queue command from the queue to the memory controller 120. As described above, the queue command is input by the first port decode logic 216 that determines which memory port 124-130 the computer system 100 may (e.g., must) access to service the queue command based on a real memory address associated with the queue command. Such memory port information is output by the first port decode logic 216 and input by the PQ Read Taken logic 260. Further, as described above, the queue command is input by the first address normalize logic 220 for converting a real memory address associated with a queue command to physical memory address associated with the queue command. The output from the first address normalize logic 220 may be input by the PQ Read Taken logic 260. More specifically, a signal (e.g., Valid), which indicates whether a command is valid, included in the queue command that is output from the first address normalize logic 220 may be input by the PQ Read Taken logic 260.

Additionally, the output of the first address normalize logic 220 may be input by the second address translate logic 258 for converting a physical memory address associated with a command to a DRAM address associated with the command. The second address translate logic 258 converts the physical memory address associated with the queue command to a DRAM address associated with the queue command and outputs the queue command with the associated DRAM address to the fourth through seventh multiplexers 250-256 coupled to the first 124 through fourth memory ports 130, respectively.

In step 306, a second command for servicing is received in the memory controller, wherein the second command is of a second priority that is higher than the first priority. For example, the request handler logic 116 may output data received from the first bus 106, second bus 110 and a scalability port to the memory controller 120. Such data may include one or more of a processor command and scalability port command, both of which are of a higher priority than a queue command, and therefore, will be serviced before a queue command that requires service through the same port as the processor or scalability port command. More specifically, because processors connected to the first bus 106 are out of phase with the processors connected to the second bus 110, during a time period, the request handler logic 116 may receive a command (e.g., a valid command) from a processor coupled to one of the first 106 or second bus 110. Data received from the other bus during the time period is not a valid command. During such time period, the request handler logic may receive a command from the scalability port 112.

The request handler logic 116 outputs data received from the first bus 106, second bus 110 and scalability port 112 to the memory controller 120. The first multiplexer 230 is adapted to selectively output a command from the first 106 or second bus 110 (e.g., a valid command (if such a command is received).

Similarly, the second multiplexer 240 selectively outputs a processor command or a scalability port command. In some embodiments, processor commands are preferred over scalability port commands, and therefore, if Valid included in such scalability port command is asserted and Valid included in the processor command is not asserted, the second multiplexer 240 may output the scalability port command. Otherwise, the second multiplexer 240 outputs the processor command. In such cases, the scalability port command may be transmitted to the pending queue logic 118 for storing while pending, and therefore, will travel the queued path.

As described above, the output of the second multiplexer 240 is coupled to and input by second port decode logic 242, and therefore, the command (e.g., processor or scalability port command) output by the second multiplexer 240 is input by the second port decode logic 242 that determines which memory port 124-130 the computer system 100 may (e.g., must) access to service the processor or scalability port command based on a real memory address associated with the processor or scalability port command. Such memory port information is output by the second port decode logic 242 and input by the PQ Read Taken logic 260.

Further, as described above, the processor command (e.g., a processor command received from the first 106 or second bus 110) output by the first multiplexer 230 is input by the second address normalize logic 232 for converting a real memory address associated with a processor command to physical memory address associated with the queue command. Similarly, the scalability port data received from the request handler logic 116 may be input by the third address normalize logic 236 for converting a real memory address associated with a scalability port command to physical memory address associated with the scalability port command.

The output from the second 232 and third address normalize logic 236 may be input by the third multiplexer 246, which selectively outputs the processor command or scalability port command (e.g., a processor or scalability port command). The output of the third multiplexer 246 is input by the PQ Read Taken logic 260. More specifically, a signal, which indicates whether a command is valid, included in the command output from the third multiplexer 246 may be input by the PQ Read Taken logic 260.

Additionally, the processor or scalability port command output from the third multiplexer 246 may be input by the first address translate logic 248 for converting a physical memory address associated with a command to a DRAM address associated with the command. The first address translate logic 248 converts the physical memory address associated with the processor or scalability port command to a DRAM address associated with the processor or scalability port command and outputs the processor or scalability port command to the fourth through seventh multiplexers 250-256 coupled to the first 124 through fourth memory ports 130, respectively.

In this manner, address translation may be performed on a command of a first priority, (e.g., a queue command) and a command of a second, higher, priority (e.g., a processor or scalability port command) in parallel.

In step 308, it is determined whether the first and second commands will be serviced through the same memory port. More specifically, the PQ Read Taken logic 260 determines whether the computer system 100 may (e.g., must) access the same memory port 124-130 to service the queue command and the processor or scalability port command. Such determination is based on (1) information about which memory port 124-130 the computer system 100 may access to service the queue command; (2) a signal indicating whether the queue command is valid; (3) information about which memory port 124-130 the computer system 100 may access to service the processor or scalability port command; and (4) a signal indicating whether the processor or scalability port command is valid. In this manner, the PQ Read Taken logic 260 determines whether the queue command and processor or scalability port command may be serviced through different memory ports 124-130 during the same time period or whether the processor or scalability port command is serviced through a memory port 124-130 during a time period and the queue command is serviced through the same memory port 124-130 during a subsequent time period.

If, in step 308, it is determined the first and second commands will not be serviced through the same memory port, step 310 is performed. In step 310, the first and second commands are serviced during the same time period. More specifically, if the PQ Read Taken logic 260 determines the computer system 100 may not (e.g., will not) access the same memory port 124-130 to service the queue command and processor or scalability port command, the PQ Read Taken logic 260 may output a signal (e.g., Port0 PQ Read Taken, Port1 PQ Read Taken, Port2 PQ Read Taken or Port3 PQ Read Taken, respectively), which serves as control signal, to one of the fourth 250 through seventh multiplexers 256. Alternatively, the PQ Read Taken logic 260 may output respective control signals to a plurality of the fourth 250 through seventh multiplexers 256.

The PQ Read Taken logic 260 is adapted to output a control signal to the multiplexer 250-256 coupled to the port 124-130 which the computer system must access to service the queue command such that the multiplexer 250-256 outputs such command to the corresponding memory port 124-130. Once the queue command is output from such multiplexer 250-256, the memory port 124-130 coupled the multiplexer 124-130 may receive and store the command in a read queue 262-268 included in the memory port 124-130.

Further, the PQ Read Taken logic 260 is adapted to output a control signal to the multiplexer 250-256 coupled to the memory port 124-130 which the computer system must access to service the processor or scalability port command such that the multiplexer 250-256 outputs such command to the corresponding memory port 124-130. In some embodiments, a control signal output to each of the fourth 250 through seventh multiplexers 256 defaults to causing the multiplexer 250-256 to selectively output the processor or scalability port command. Once the processor or scalability port command is output from a multiplexer 250-256, the memory port 124-130 coupled the multiplexer 124-130 may determine whether such command is valid, and if so, receive and store the command in a read queue 262-268 included in the memory port 124-130.

In this manner, a queue command and a processor or scalability port command may be serviced during the same time period (e.g., simultaneously). More specifically, the computer system 100 may provide memory access to such commands during the same time period, thereby improving the efficiency with which commands are serviced by the computer system 100.

The PQ Read Taken logic 260 may employ PQ Read Taken to indicate to the pending queue logic 118 that a queue command (e.g., a read command from the queue) was serviced (or will be serviced). In this manner, the pending queue logic 118 may output another queue command for servicing to the memory controller 120 in an upcoming time period.

Thereafter, step 312 is performed. In step 312, the method 300 ends.

Alternatively, if, in step 308, it is determined the first and second commands will be serviced through the same memory port, step 314 is performed. In step 314, the second command is serviced during a first time period. More specifically, if the PQ Read Taken logic 260 determines the computer system 100 may (e.g., must) access the same memory port 124-130 to service the queue command and processor or scalability port command, the PQ Read Taken logic 260 may output signals (e.g., Port0 PQ Read Taken, Port1 PQ Read Taken, Port2 PQ Read Taken and Port3 PQ Read Taken, respectively), which serve as control signals, to one or more of the fourth 250 through seventh multiplexers 256. In this manner, the PQ Read Taken logic 260 is adapted to output a control signal to the multiplexer 250-256 coupled to the port 124-130 which the computer system 100 must access to service the processor or scalability port command such that the multiplexer 250-256 outputs such command to the corresponding memory port 124-130. The control signal may default to select the processor or scalability port command. Once the processor or scalability port command is output from such multiplexer 250-256, the memory port 124-130 coupled the multiplexer 124-130 may receive and store the command in a read queue 262-268 included in the memory port 124-130. In this manner, the processor or scalability port command may be serviced during the first time period.

The PQ Read Taken logic 260 may employ PQ Read Taken to indicate to the pending queue logic 118 that a queue command (e.g., a read command from the queue) was not serviced. In this manner, the pending queue logic 118 may not output another queue command for servicing to the memory controller 120 in an upcoming time period until the previously output queue command is serviced.

In step 316, the first command is serviced during a second time period after the first time period. More specifically, during a time period subsequent to the first time period, the PQ Read Taken logic 260 may determine the queue command may be serviced. For example, during the subsequent time period, the computer system 100 may not have to access the same memory port 124-130 to service a processor or scalability port command received in the memory controller 120 and the queue command.

Alternatively, during the subsequent time period, only the queue command may require servicing. Therefore, the computer system 100 may access the memory port 124-130 necessary to service the queue command during the subsequent time period. Thereafter, step 312 is performed, in which the method 300 ends.

Through use of the method 300, if the computer system determines it may (e.g., must) not access the same memory port to service a first command of a first priority and second command of a second, higher, priority (e.g., the commands may be serviced through different memory ports), the commands may be serviced during the same time period (e.g., simultaneously). In this manner, servicing of the first command may not be delayed as frequently as in a conventional system for servicing commands. In this manner, the efficiency with which commands are serviced in a computer system or the like is improved. The present methods and apparatus are particularly useful when employing memory configurations that are typically employed for performance benchmark testing.

The foregoing description discloses only exemplary embodiments of the invention. Modifications of the above disclosed apparatus and methods which fall within the scope of the invention will be readily apparent to those of ordinary skill in the art. For instance, although operation of the apparatus 100 is described above with reference to time periods in which a first and second command require servicing, it should be understood that the apparatus may also be employed during time periods in which no commands or a single command requires servicing. For example, the apparatus 100 is adapted to service only a processor or scalability port command during the time period. Alternatively, as described above, the apparatus 100 is adapted to service only a queue command during the time period. The configuration of the command servicing logic 102 is exemplary, and therefore, different configurations may be employed. For example, although a single address translate logic (e.g., the second address translate logic 248) is employed for converting a physical memory address associated with a processor or scalability port command to a DRAM address, in other embodiments, separate logic may be employed for converting a physical memory address associated with the processor command to a DRAM address associated with the processor command and for converting a physical memory address associated with a scalability port command to a DRAM address associated with the scalability port command, respectively.

Although the present methods and apparatus may be employed for servicing two commands during the same time period (e.g., simultaneously), in other embodiments, a larger number of commands may be serviced in the same time period. Further, the present methods and apparatus allow acceptance and processing of a queue command when the queue command and a higher priority command (e.g., a processor or scalability port command) are presented on the same cycle but there is a collision between the queue command and the higher priority command. A collision occurs between commands when the computer system must access the same memory port to service such commands. Further, in the embodiments described above it was assumed that a read queue 262-268 which the computer system 100 may access to service a command is not full/busy, and therefore, may receive such command for servicing. However, in some embodiments, the computer system 100 may determine whether a read queue 262-268, which may be accessed by the computer system 100 to service a command, is full/busy while servicing commands according to the present methods and apparatus. Further, the first 216 and second port decode logic 242 operate on a real memory address associated with incoming commands in order to meet critical timing requirements. In this manner, multiple copies of signals indicating which command (e.g., a queue command, or a processor or scalability port command) is selected for servicing may be stored such that a copy of the signal may be provided to each of the fourth 250 through seventh multiplexers 256 and/or the pending queue logic 118.

Accordingly, while the present invention has been disclosed in connection with exemplary embodiments thereof, it should be understood that other embodiments may fall within the spirit and scope of the invention, as defined by the following claims.

The invention claimed is:

1. A method of servicing commands, comprising:
   receiving a first command to service in a memory controller including a plurality of memory ports, wherein the first command is of a first priority;
   receiving a second command to service in the memory controller, wherein the second command is of a second priority that is higher than the first priority;
   determining whether the first and second commands will be serviced through the same memory port; and
   if the first and second commands will not be serviced through the same memory port, servicing the first and second commands during the same time period.

2. The method of claim 1 wherein determining whether the first and second commands will be serviced through the same memory port includes: determining a memory port of the memory controller through which the first command will be serviced based on a real memory address associated with the first command; and
   determining a memory port of the memory controller through which the second command will be serviced based on a real memory address associated with the second command.

3. The method of claim 1 further comprising:
   converting a real memory address associated with the first command to a physical memory address associated with the first command;
   converting a real memory address associated with the second command to a physical memory address associated with the second command; and
   converting the physical memory address associated with the first command to a DRAM address associated with the first command and converting the physical memory address associated with the second command to a DRAM address associated with the second command in parallel.

4. The method of claim 1 further comprising: if the first and second commands will be serviced through the same memory port, servicing the second command during a first time period; and servicing the first command during a second time period after the first time period.

5. The method of claim 1 wherein receiving a second command for servicing in a memory controller includes: receiving a command from a processor and from a scalability port of the memory controller, wherein the scalability port couples the memory controller to a second memory controller; and selecting the command from the processor as the second command for servicing.

6. The method of claim 5 further comprising sending the command received from the scalability port to a queue of pending commands.

7. The method of claim 1 wherein the first command is from a queue of pending commands; and further comprising, notifying the queue of pending commands whether the first command is selected for servicing.

8. The method of claim 1 further comprising determining whether respective memory ports through which the first and second commands will be serviced are available to receive a command; and wherein if the first and second commands will not be serviced through the same memory port, servicing the first and second commands during the same time period includes, if the first and second commands will not be serviced through the same memory port and respective ports through which the first and second commands will be serviced are available to receive a command, servicing the first and second commands during the same period.

9. The method of claim 1 wherein servicing a command through the memory port includes storing the command in a read queue of the memory port.

10. An apparatus for servicing commands, comprising:
request handler logic to receive commands to service from at least one of a processor and a scalability port;
queue logic for receiving commands for servicing from at least one of the request handler logic and an input/output (I/O) port; and
a memory controller to interface with memory, including a plurality of memory ports, coupled to the request handler logic and the queue logic;
wherein the apparatus is adapted to:
receive a first command to service in the memory controller, wherein the first command is of a first priority;
receive a second command to service in the memory controller, wherein the second command is of a second priority that is higher than the first priority;
determine whether the first and second commands will be serviced through the same memory port; and
if the first and second commands will not be serviced through the same memory port, servicing the first and second commands during the same time period.

11. The apparatus of claim 10 wherein the apparatus is further adapted to: determine a memory port of the memory controller through which the first command will be serviced based on a real memory address associated with the first command; and
determine a memory port of the memory controller through which the second command will be serviced based on a real memory address associated with the second command.

12. The apparatus of claim 10 wherein the apparatus is further adapted to:
convert a real memory address associated with the first command to a physical memory address associated with the first command;
convert a real memory address associated with the second command to a physical memory address associated with the second command; and
convert the physical memory address associated with the first command to a DRAM address associated with the first command and converting the physical memory address associated with the second command to a DRAM address associated with the second command in parallel.

13. The apparatus of claim 10 wherein the apparatus is further adapted to: if the first and second commands will be serviced through the same memory port, servicing the second command during a first time period; and servicing the first command during a second time period after the first time period.

14. The apparatus of claim 10 wherein the apparatus is further adapted to:
receive a command from the processor and from a scalability port of the memory controller, wherein the scalability port couples the memory controller to a second memory controller; and
selecting the command received from the processor as the second command for servicing.

15. The apparatus of claim 14 wherein the apparatus is further adapted to send the command received from the scalability port to a queue of pending commands included in the queue logic.

16. The apparatus of claim 10 wherein the first command is from a queue of pending commands included in the queue logic; and wherein the apparatus is further adapted to notify the queue of pending commands whether the first command is selected for servicing.

17. The apparatus of claim 10 wherein the apparatus is further adapted to: determine whether respective memory ports through which the first and second commands will be serviced are available to receive a command; and if the first and second commands will not be serviced through the same memory port and respective ports through which the first and second commands will be serviced are available to receive a command, service the first and second commands during the same period.

18. The apparatus of claim 10 wherein the apparatus is further adapted to store a command in a read queue of a memory port.

* * * * *